United States Patent [19]
Arnaud et al.

[11] Patent Number: 4,629,169
[45] Date of Patent: Dec. 16, 1986

[54] HYDROPNEUMATIC OLEOPNEUMATIC VEHICLE SUSPENSION ELEMENT

[75] Inventors: Alain Arnaud, Chatenay Malabry; Thierry Bouiges, Paris, both of France

[73] Assignee: S.A.M.M. - Societe d'Applications des Machines Motrices, Issy Les Moulineaux, France

[21] Appl. No.: 680,692

[22] Filed: Dec. 12, 1984

[30] Foreign Application Priority Data

Dec. 14, 1983 [FR] France ............................. 83 20063

[51] Int. Cl.$^4$ .............................................. F16F 9/08
[52] U.S. Cl. .................................. 267/64.19; 188/274; 165/47; 280/705
[58] Field of Search ............... 188/274, 275, 276, 277, 188/298, 264 CC; 280/707, 708, 705; 267/64.19, 64.23, 64.27, 64.15; 165/47 H

[56] References Cited

U.S. PATENT DOCUMENTS

| | | | |
|---|---|---|---|
| 2,949,315 | 8/1960 | Taylor | 267/64.19 |
| 3,088,726 | 5/1963 | Dangauthier | 267/64.19 |
| 3,602,470 | 8/1971 | Reynolds | 280/124 |
| 3,660,784 | 5/1972 | Scharfman | 165/47 H |
| 3,795,291 | 3/1974 | Naito et al. | 188/274 |
| 4,061,320 | 12/1977 | Warner | 267/64 R |
| 4,113,279 | 9/1978 | Hausenblaus et al. | 280/705 |
| 4,156,536 | 5/1979 | Brandstater | 280/705 |

FOREIGN PATENT DOCUMENTS

| | | | |
|---|---|---|---|
| 45269 | 2/1982 | European Pat. Off. | |
| 1233662 | 2/1967 | Fed. Rep. of Germany | 188/274 |

Primary Examiner—Duane A. Reger
Assistant Examiner—Matthew C. Graham
Attorney, Agent, or Firm—Sughrue, Mion, Zinn, Macpeak & Seas

[57] ABSTRACT

An oleopneumatic vehicle suspension element in particular for a heavy vehicle, comprising a piston (29) movable in a cylinder (28), a gas accumulator (26), a shock absorber (36) immersed in oil (37) filling the volume between the piston (29) and a diaphragm (27). According to the invention, the suspension element comprises a caloduct (50) connecting the shock absorber (36) to a cold source formed by a free surface (42) of the housing (33) of the suspension element (25), the caloduct (50) containing a fluid which evaporates in contact with the shock absorber (36) heated by the oil, then travels to the cold source (42) where it is condensed and returns thereafter to the shock absorber (36) where it again evaporates. This cooling device enables the temperature of the oil to be limited to the maximum acceptable value and maintains the ground clearance of the vehicle constant.

9 Claims, 7 Drawing Figures

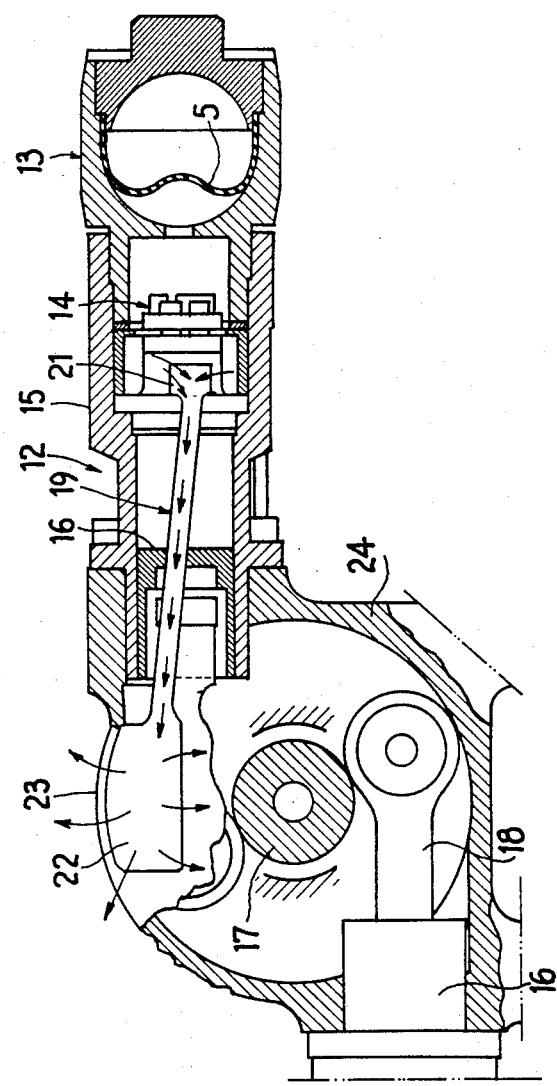
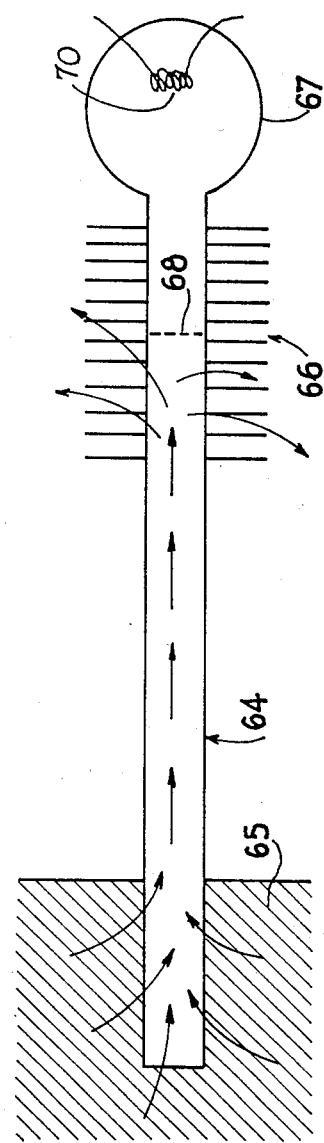
FIG.2
FIG.6

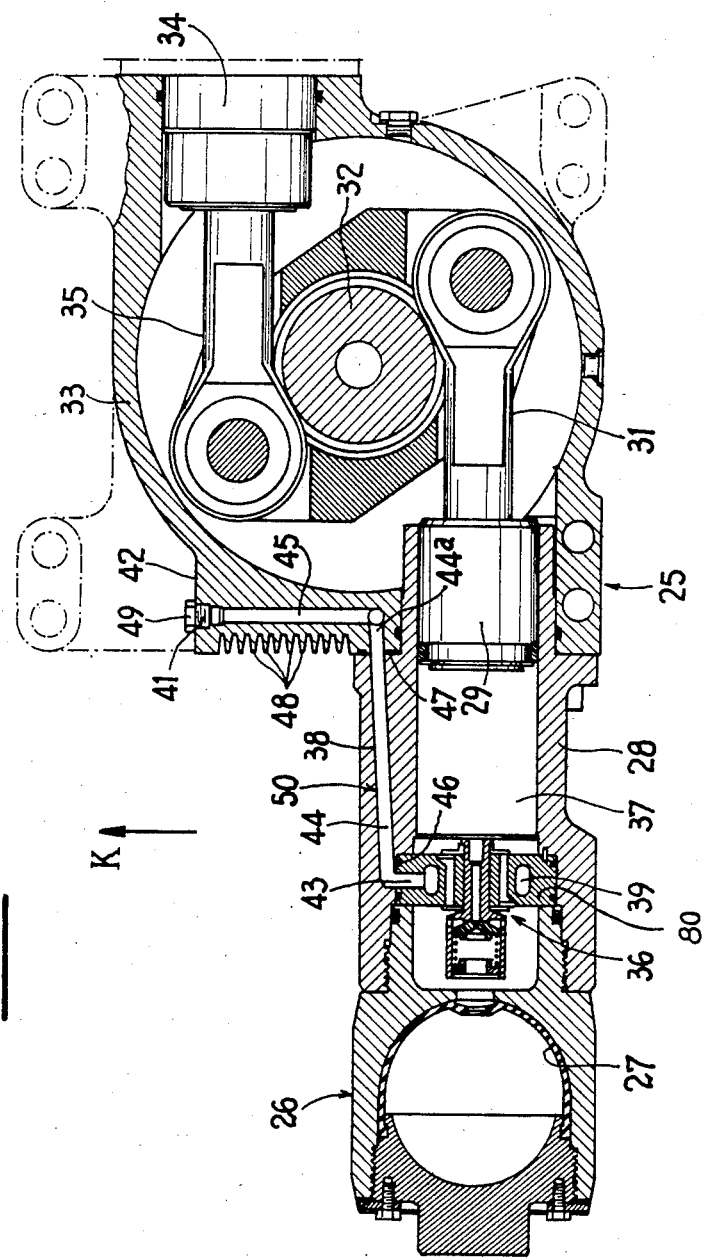

HYDROPNEUMATIC OLEOPNEUMATIC VEHICLE SUSPENSION ELEMENT

BACKGROUND OF THE INVENTION

The present invention relates to a hydropneumatic and, in particular, an oleopneumatic vehicle suspension element for heavy vehicles such as armoured vehicles.

It is known that an oleopneumatic suspension element comprises a piston movable in a cylinder, a gas accumulator connected to the cylinder and containing gas and a liquid separated from the gas by a flexible diaphragm, and a damping cartridge placed in the liquid between the piston and the diaphragm.

The shock absorption is achieved in an elegant and convenient manner by constraining the oil to pass through diffusers of the cartridge thereby creating, upon displacements of the piston in one direction or the other, a pressure drop which increases with increase in speed.

This dissipation has two consequences:

(a) It heats the oil, and thus limits the utilization of the suspension element to a maximum temperature imposed by the mechanical parts (joints, diaphragms) which are sensitive to these temperatures. In practice, this limit temperature of the oil is about 140° C.

(b) It heats the gases of the accumulator (nitrogen), and thus increases the mean pressure of operation of the element. Consequently, by reaction, there is a variation (increase) in the height of the chassis of the vehicle above the ground, i.e. its ground clearance. Such a variation in the ground clearance may also be produced, although on a smaller scale, by large variations in the atmospheric temperature.

Consequently, the temperature of the oil must be limited so that it is correspondingly possible to maintain the height of the chassis of the vehicle above the ground substantially constant. For this purpose, there has been proposed a device for cooling the whole of the suspension formed by a series of these elements, by cooling the oil of the latter. Moreover, it is attempted usually to cool simultaneously the oil of all the elements constituting the suspension. But such a device requires a specific cooling installation comprising a pump and a radiator which is expensive and unreliable. Oil injecting systems have also been employed which use a central hydraulic unit. This central unit is expensive and unreliable. Indeed, in the event of leackages or breakage of the oil injecting piping, the suspension is put out of use. Further, it is in practice relatively difficult to inject oil in an oleopneumatic suspension element during the operation of the latter.

SUMMARY OF THE INVENTION

An object of the invention is to overcome these drawbacks and to provide an arrangement which is simple and reliable and much less expensive than the devices mentioned hereinbefore.

According to the invention, the means for cooling the liquid of the suspension element comprise a caloduct or heat duct connecting the shock absorber cartridge, which constitutes a hot source, to a cold source formed by the chassis of the vehicle or by a free surface of the element itself, the caloduct containing a gas which is capable of evaporating in contact with the cartridge and then travelling to the cold source where it is condensed and then returning to the cartridge constituting an evaporator by repeating the cycle, the cold source being located above the hot source constituted by the shock absorber cartridge.

Thus the caloduct is incorporated in the suspension element in such manner that it is capable of bringing the temperature of the shock absorber to a practically constant thermal potential materialized by the chassis of the vehicle or by a free surface of the suspension element. As the temperature of the chassis is relatively uniform, each suspension element is thus made to operate at a temperature which depends practically only on climatic or seasonal conditions.

The caloduct constitutes a thermal drain having a high heat flow which limits the operating temperature of the oil and consequently maintains the ground clearance of the vehicle substantially constant.

These advantages are particularly appreciable when the suspension is required to operate under severe conditions, and in particular on uneven ground, as may be met with in the case of armoured vehicles.

According to an embodiment of the invention, the caloduct is formed by a closed conduit extending from the interior of the shock absorber cartridge to a free surface of a body which is fixed to the cylinder and through which extends a wheel-carrying arm, this conduit being formed in the wall of the cylinder and in the body, and means are provided for sealing the conduit where it passes from the wall of the cylinder into the body.

The free and relatively cooler surfaces of the suspension element itself may indeed be used instead of providing a connection with the chassis. This already enables the temperature of the shock absorber to be lowered substantially.

Another object of the invention is to provide a device for varying the ground clearance of the vehicle which is indeed advantageous under certain conditions of utilization of heavy vehicles, for example on muddy or sandy ground in which the vehicle is liable to become bogged or embedded.

For this purpose, according to the invention, the caloduct communicates, beyond its end located in the cold source, with a chamber containing a gas which is incondensable within the considered range of temperatures for the suspension element and its shock absorber cartridge, and a source of heat such as a heating resistance whose adjustment permits shifting a front between the two gases and consequently the temperature of the liquid of the element and the ground clearance of the vehicle Indeed, it will be understood that the adjustment of the source of heat placed in the chamber permits shifting the front between the two gases, and consequently increasing or decreasing the temperature of the oil in the element, depending on whether this front moves away from or approaches the chamber, so that the surface in fact offered by the cold source for evacuating heat decreases or, on the contrary, increases.

BRIEF DESCRIPTION OF THE DRAWINGS

Further features and advantages of the invention will be apparent from the ensuing description, with reference to the accompanying drawings, which illustrate by way of non-limiting examples several embodiments thereof:

FIG. 2 is an axial sectional view of a second hydropneumatic suspension element provided with a caloduct diagrammatically represented;

FIG. 3 is an axial sectional view of an industrial emobodiment of a suspension element provided with a caloduct for evacuating heat dissipated by the oil in the course of operation;

FIG. 6 is a diagram illustrating the principle of the combination, in a hydropneumatic suspension element, of a caloduct and a chamber containing an adjustable source of heat for adjusting the ground clearance of the chassis of the vehicle;

DETAILED DESCRIPTION OF THE PREFERRED EMBODIMENTS

Figure 1:
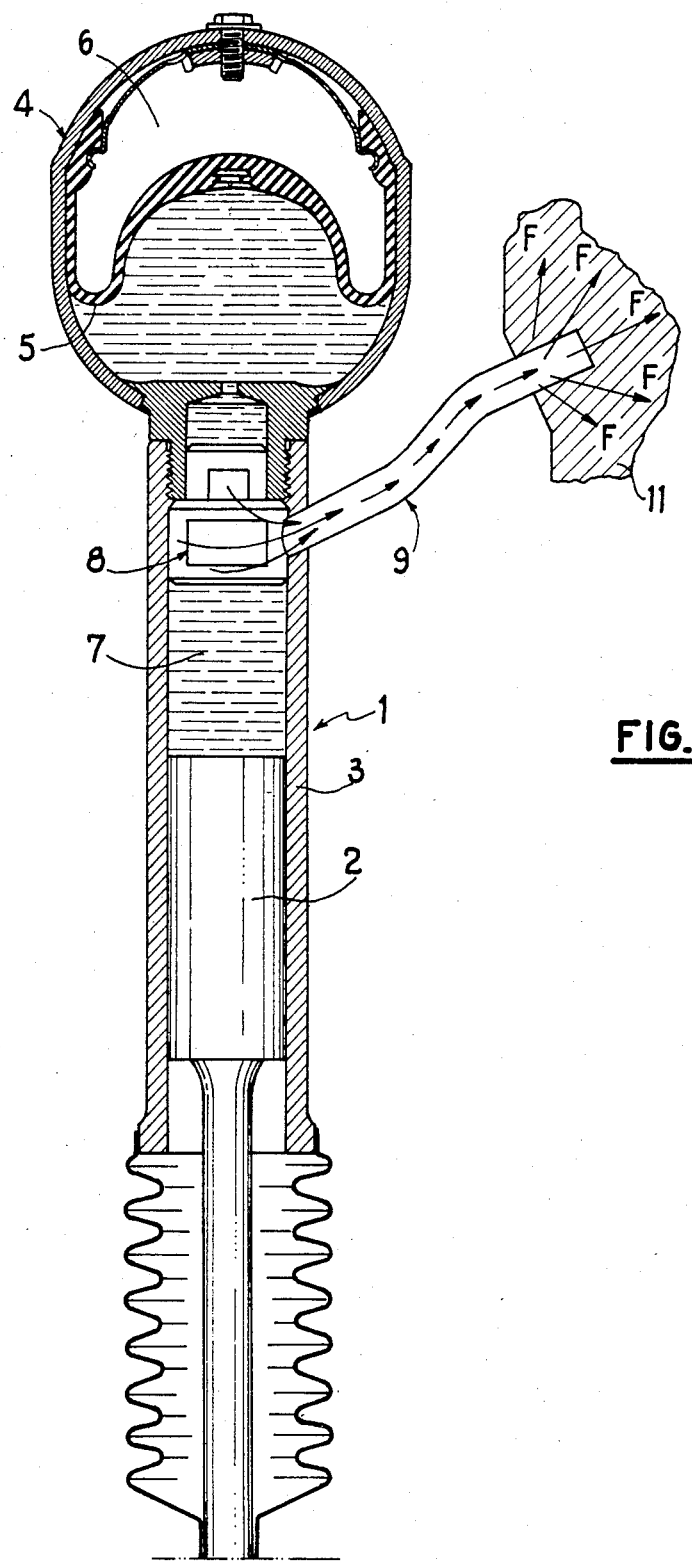
FIG. 1 is a longitudinal sectional view of a hydropneumatic suspension element provided with a caloduct or heat duct illustrated diagrammatically.

With reference to FIG. 1, there is shown an oleopneumatic suspension element 1 conventionally comprising a piston 2 movable in a cylinder 3, a gas accumulator 4 provided internally with a flexible diaphragm 5 providing a partition between a volume 6 of gas and oil 7 filling the space between the piston 2 and the diaphragm 5, and a shock absorber cartridge 8 placed in the liquid 7 between the piston 2 and the diaphragm 5. These elements are known per se and will therefore not be described in more detail.

The element 1 is also provided with means for cooling the oil 7 and correspondingly adjusting the ground clearance of the chassis of the vehicle.

According to the invention, these means comprise a caloduct or heat duct 9 which is diagrammatically represented and connects the shock absorber cartridge 8, which constitutes a hot or warm source, to a cold source 11 which may be the chassis of the vehicle or a free surface of the element 1 itself. The caloduct 9 is a conduit containing a gas which is capable of evaporating upon contact with the cartridge 8 and then travelling, as indicated by the arrows, to the opposite end of the conduit, in the cold source 11, where the heat conveyed by the gas is dissipated (arrows F), the gas condensing into fine droplets at this end of the caloduct 9. As the cold source 11 is located above the source of heat constituted by the cartridge 8 forming the evaporator the droplets of condensed gas gradually redescend along the wall of the caloduct 9 and then evaporate again in the cartridge 8, after which the preceding cycle recommences, throughout the operation of the suspension element 1, i.e. during the movements of the vehicle incorporating a series of these elements.

Indeed, during the movements of the piston 2 produced by unevennesses of the ground or by rolling defects, the oil 7 under pressure is urged back into the accumulator 4 where it compresses or expands the gas 6. During these movements, the oil travels through the cartridge 8 where it dissipates energy in the form of heat. Owing to the presence of the caloduct 9 which starts within the shock absorber 8, the heat energy which progressively heats the oil is mainly evacuated through the caloduct 9 to the cold source 11.

If this cold source 11 is the chassis of the vehicle, whose temperature varies little from one point to the other, the various suspension elements 1 evacuate their heat to cold sources which are substantially at the same temperature, the latter being the mean temperature of the chassis. This has the advantage of limiting dissymmetries due to temperature differences when the vehicle is stationary.

Thus, it will be understood that the use of a caloduct or heat duct 9 associated with each suspension element 1 limits the temperature (in practice to about 140° C.) and therefore ensures that the mechanical parts of the element are maintained in a good condition and, moreover, maintains practically constant the ground clearance of the chassis, irrespective of unevennesses of the ground.

FIG. 2 shows a suspension element 12 comprising a gas accumulator 13, a shock absorber cartridge 14, a cylinder 15, a piston 16 which cooperates in the known manner with an arm 17 carrying a wheel (the latter has not been shown), this arm 17 being also associated with another piston 16 of a second suspension element which is identical to the element 12.

Each piston 16 carries a rod 18 cooperating in the known manner with the arm 17.

Each element, such as the element 12, is provided with a caloduct or heat duct 19 diagrammatically represented and constituted by a conduit which starts in a chamber 21 inside the shock absorber 14 and leads to a closed compartment 22 which is contiguous to the free surface 23 of a body 24 which is coaxial with the arm 17 and to which the cylinders 15 are fixed.

The caloduct 19 operates in the same way as that described with reference to FIG. 1, except that the cold source is here constituted by the free surface 23 of the body 24 of the suspension element 12 itself.

In the event of an intensive operation of the suspension, the whole of each element 12 rapidly reaches the limit temperature. FIG. 3 illustrates an industrial embodiment of a suspension element 25 which comprises, in the known manner, as in the preceding embodiments, a gas accumulator 26 having a flexible diaphragm 27, a cylinder 28 containing a slidable piston 29 extended by a rod 31 which cooperates with an arm 32 carrying a wheel and disposed in a housing 33 coaxial with this arm, which is also associated with a second piston 34 identical to the piston 29 and also provided with a rod 35.

The arm 32 therefore cooperates with two identical suspension elements 25 having a common housing 33 fixed to their respective cylinders 28, each element 25 being provided with a shock absorber cartridge 36 through which travels the oil 37 alternately in each direction during the movements of the pistons 29, 34.

According to the invention, each element 25 is provided with a caloduct or heat duct 38 formed by a closed conduit, having one end formed by a chamber 39 provided within the cartridge 36 and coaxially with the latter, and an opposite end 41 which is contiguous to a free surface 42 of the housing 33. Between these two ends 39, 41, the conduit 38 has a first section 43 which is provided radially in the cartridge 36 and communicates with the wall of the cylinder 28, a second section 44 formed in the wall of the cylinder 28 and communicating at 44a with the housing 33, and a third section 35 which extends radially in the housing 33 to the end 41.

Each of the cartridges 35 comprises a cylindrical element 80 in which is formed the section 43 of the caloduct 38. The elements 80 and the pistons 29 are made from a material which provides a good thermal conduction and a good thermal capacity, such as copper or a copper alloy (bronze).

O-rings 46 and 47 provide a seal respectively between the shock absorber 36 and the cylinder 28 and between the latter and the housing 33, in the region of the conduit 38 containing a condensable gas appropriate for the considered range of temperatures so that the fluidtightness of this conduit is guaranteed.

Fins 48 are provided on the surface of the housing 33 in the region of the section 45 so as to facilitate the evaporation of the heat to the exterior, the end 41 being closed by a screw 49.

When the oil travels alternately in opposite directions through the shock absorber cartridge 36 owing to the reciprocating movement of the piston 29 during the travelling of the vehicle over the ground which causes the temperature of the oil to rise, the corresponding heat is mainly received in the chamber 39 where the condensed gas (for example a freon) evaporates. The upper part of the element 25 being indicated by the arrow K, i.e. the end 41 being at a level above the upper surface of the chamber 39, the gas rises through the sections 43, 44 and 45 up to the end 41 constituting a cold source where it is condensed into fine droplets, while the heat conveyed by the gas is evacuated progressively in the region of the section 45 and through the end 41 and the housing 33 aud its free surface 42. The droplets of condensed gas formed then progressively redescend to the chamber 39 forming an evaporator, through the sections 45, 44 and 43, where they once again evaporate so that the preceding cycle recommences.

Figure 4:
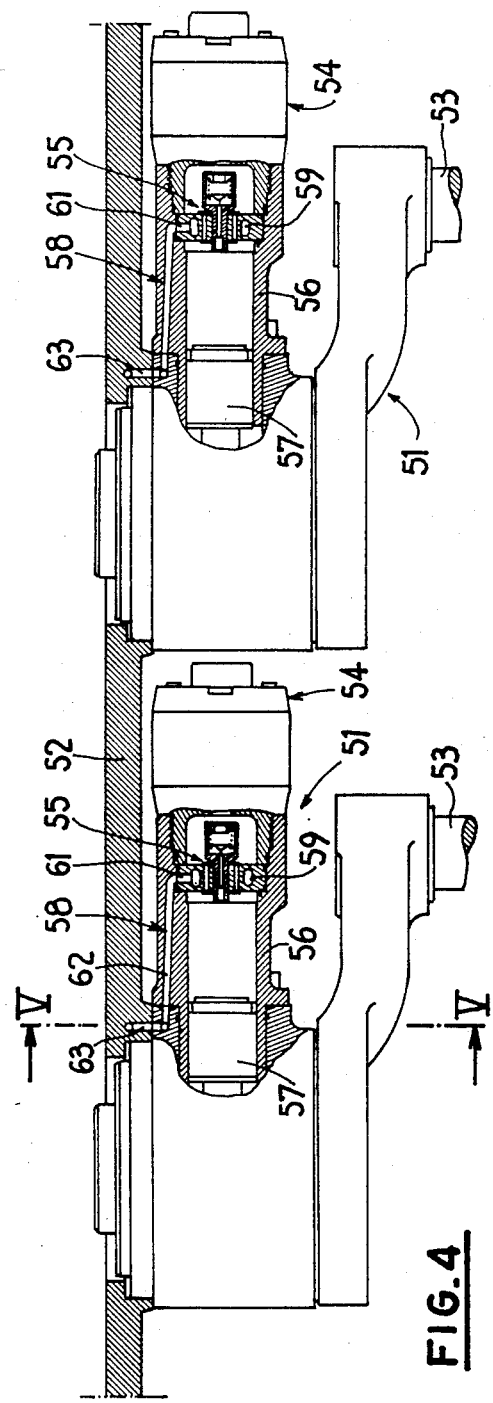
FIG. 4 is a half-axial sectional view and half-elevational view of a second industrial embodiment of the invention, showing two hydropneumatic suspension elements each provided with a caloduct which leads to the chassis of the vehicle.
Figure 5:
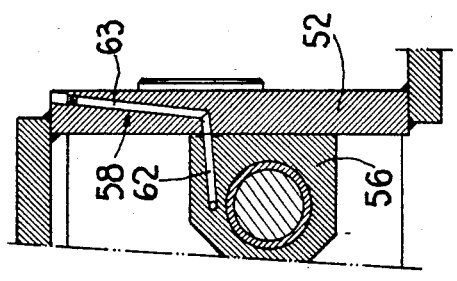
FIG. 5 is a cross-sectional view taken on line V—V of FIG. 4.

In the industrial embodiment of the suspension shown in FIG. 4, there are shown two elements 51 of this suspension disposed between the chassis 52 of the vehicle and the corresponding stub-axles 53 of the wheels. Each element 51 comprises a gas accumulator 54, a shock absorber cartridge 55, a cylinder 56 containing a piston 57, and a caloduct or heat duct 58 connecting a chamber 59, formed in the cartridge 55 in coaxial relation to the latter, to a cold source constituted by the chassis 52.

Each caloduct 59 thus comprises, starting at the chamber 59, a first section 61 in the cartridge 55, a second section 62 in the wall of the cylinder 56, and a third section 63 which is formed in the chassis 52 and constitutes the cold source or condenser.

The sections 61, 63 are formed radially relative to the general axis of the elements 51, while the sections 62 extend in a direction roughly parallel to this axis, so that, if the vehicle is assumed to be on a horizontal plane, the sections 63 are located at a height above the ground which exceeds that of the sections 61.

The caloducts 58 operate in the same way as that of the preceding embodiments with, with respect to those shown in FIGS. 2 and 3, the feature that the cold source is formed by the chassis 52 of the vehicle and not by a free surface of the housing of the suspension element.

Thus, the cold sources or condenser sections 63 are connected to the chassis 52 whose thermal potential is substantially constant. Each suspension element 51, notwithstanding the fact that it is isolated or independent, thus maintains a ground clearance which is constant and identical to that of the other elements.

When the vehicle is a heavy machine, for example having a weight exceeding 20 metric tons, the thermal inertia is considerable and the relatively high time constant of the caloducts 58, or 19, or 38 (FIG. 3) filters instabilities of short durations.

In the various embodiments described hereinbefore, the presence of caloducts enables the oil of the suspension to be thermally controlled, by limiting its temperature to a maximum value acceptable for the mechanical parts of the suspension, with great reliability Indeed, this controlling device has no moving part and as each thermal circuit of the caloduct associated with an element is independent of the other circuits and other elements, any breakdown of one circuit has no incidence on the operation of the neighbouring circuits, so that this breakdown is not propagated.

These devices employing caloducts are cheap compared to known prior devices owing to their simplicity.

FIG. 6 shows the principle of the utilization of a caloduct or heat duct 64 connecting an evaporator 65 (hot source) of a suspension element having a cold source (condenser 66) with a chamber 67 containing a gas which is incondensable within the considered temperature range for the suspension element and its evaporator 65, a hot source such as a heating resistance 70 being placed within the chamber 67.

The volume of the chamber 67 is large relative to that of the caloduct 64, for example one litre for a caloduct 64 having a capacity of 100 cc. The caloduct 64 and the chamber 67 are filled with a mixture of two gases, one being condensable while the other is incondensable within the concerned temperature range. Thus the condensable fluid may be for example an alcohol, an oil, a freon, or water, which fluids can coexist in the liquid state and gaseous state within the temperature range of the element. The temperature of the suspension element is normally between $-40°$ C. and $+60°$ C., which are extreme atmospheric temperatures in which the vehicle may be used, the temperature of the shock absorber or the evaporator being between 60° and 140° C., and normally about 90° C.

Under these conditions, nitrogen may, for example, be used as the incondensable gas in the chamber 67, this gas liquifying at $-195°$ C.

The device diagrammatically represented in FIG. 6 then operates in the following manner:

At rest, the two gases are mixed and droplets of the condensable gas are deposited in the vicinity of the coldest points, i.e. on the wall of the caloduct extending through the cold source 66. If the evaporator 65, the caloduct 64 and the chamber 67 are at equal temperatures, this distribution is practically uniform and the incondensable gas fills practically almost the whole of the volume of the caloduct 64 and the chamber 67.

In normal operation of the suspension element including the evaporator 65, the absorption of the heat at the hot source evaporates the condensable gas which travels toward the cold source 66 along the path symbolically represented by the arrows. The condensable gas is liquified on the inner wall of the cold source 66 from which the heat is dissipated and then returned toward the hot source by the effect of capillarity, gravity, etc. Very rapidly, the incondensable gas is evacuated from the caloduct 64, and returned to the chamber 67 so that a "front" 68 is formed between the condensable gas and the incondensable gas, this front being normally located between the ends of the cold source 66 and being very "rigid", i.e. in normal operation, it may move along one or two millimetres.

If the temperature is then varied in the chamber 67 by means of the heating resistance 70 (which may be supplied with current, for example, from the battery of the vehicle), the "front" 68 moves along the caloduct 64. If the temperature in the chamber 67 is raised, the front 68 moves in the direction of the evaporator 65 so that the cooling surface offered in the cold source 66 to the condensable gas decreases. Consequently the amount of heat evacuated by the evaporator 65 decreases and as a result the temperature of the shock absorber cartridge, forming the evaporator 65, and the temperature of the oil increase. The ground clearance of the chassis of the vehicle therefore increases.

On the other hand, if the temperature in the chamber 67 is lowered by reducing the heating effect of the resistance 70, the front 68 moves toward the chamber 67, the cooling and heat evacuating surface in the cold surface 66 offered to the condensable gas increases, and the temperature of the evaporator 65 and the temperature of the oil of the suspension element decrease. As a result, the ground clearance of the vehicle decreases.

Thus, such a device permits an adjustment of the ground clearance of the chassis of the vehicle, solely by adjusting the heating in the chamber 67 by means of the resistance 70. It will be understood that this device is only active when the vehicle is moving and there is consequently a dissipation of energy.

Such a device for adjusting the ground clearance is of definite interest in particular circumstances of utilization of heavy vehicles, for example on muddy or sandy ground. Indeed, the increase in the ground clearance of the vehicle can ensure that it is not "aspirated" by the mud in which it sinks or does not remain embedded in the sand.

Figure 7:
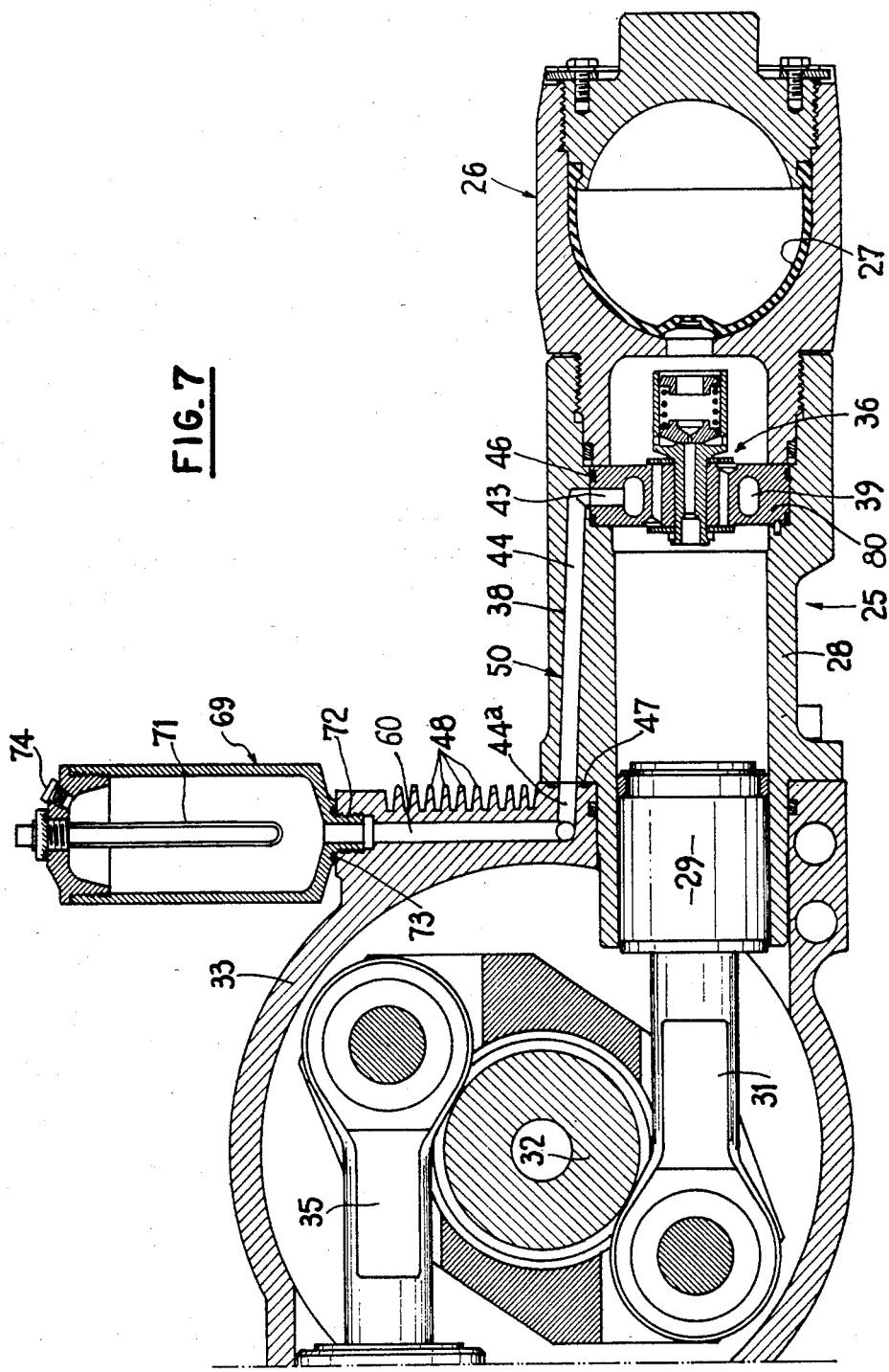
FIG. 7 is an axial sectional view of a third industrial embodiment of the invention employing the principle illustrated in FIG. 6.

FIG. 7 shows an industrial embodiment of the device adjusting the ground clearance of a vehicle whose principle of operation is diagrammatically represented in FIG. 6.

The suspension element 25 is here identical to that shown in FIG. 3, and the section 45 of the caloduct or heat duct 50 communicates with a reservoir or chamber 69 whose capacity is distinctly greater than that of the caloduct 50 and which is internally provided with a heating resistance 71. This chamber or flask 69 contains a gas incondensable in the considered temperature range and is provided with an end element 72 which extends in a sealed manner into the housing 33 and is connected to the section 45 of the caloduct 50. A seal is provided between the chamber 69 and the housing 33 by an O-ring 73.

A plug 74 placed in the upper part of the chamber 69 enables the latter to be filled with the incondensable gas.

Each suspension element of the vehicle can then be provided with a chamber 69 supplied with electricity by a suitable source, such as the battery of the vehicle.

This device for adjusting the ground clearance of a vehicle operates in the same way as that described with reference to FIG. 6.

By way of a modification, in the various embodiments described, a tube containing the condensable gas may be disposed in the conduit constituting the caloduct.

The caloduct provided by the invention only starts to remove heat produced by the shock absorber (8,14,36,55) beyond a threshold value of temperature which varies with the type of caloduct.

If this threshold is suitably chosen, it permits at low temperature a rapid heating of the oil by the laminating effect, the caloduct being blocked. Beyond the temperature threshold corresponding to the caloduct, the latter starts to operate with an increasing efficiency and transfers the heat produced during the lamination.

A rapid heating of the oil to its optimum operating tempeature then results.

On the other hand, if there is little heat produced in the shock absorber and the surrounding temperature is lower than the starting threshold of the caloduct, the latter is blocked and retards the cooling of the oil. The use of a water caloduct, whose starting threshold is at 50° C. and which remains effective up to about 120° C., enables the maximum advantage to be taken of the threshold effect in the applications contemplated by the invention.

What is claimed is:

1. An oleopneumatic vehicle suspension element particularly adapted for use with a heavy vehicle, comprising: a cylinder, a piston movable in the cylinder, a gas accumulator connected to the cylinder and containing a flexible diaphragm separating a gas and a liquid within the accumultor, a liquid flow restricting shock absorber cartridge disposed between the piston and the diaphragm and within said liquid, and means for cooling the cartridge and thus said liquid to adjust a ground clearance of a vehicle, said means for cooling the cartridge comprising means defining a cold source, a caloduct comprising an onobstructed, elongate, bidirectionally traversable fluid conduit closed at opposite ends, one of said ends being connected to the shock absorber cartridge, which forms a hot source, and another of said ends being disposed in heat exchanging communication with said cold source, and a gas contained in said caloduct capable of evaporating upon contact with the cartridge, then naturally rising to said cold source where it is condensed, and then returning to the cartridge for repeated evaporation in a continuous cyclic manner, the cold source being disposed above the cartridge to implement the gravity return of the condensed gas, wherein the means defining said cold source is on of a chassis of the vehicle and an external wall of the suspension device.

2. A suspension element according to claim 1, comprising a housing defining said external wall and fixed to the cylinder, and a wheel-carrying arm extending through said housing, the caloduct extending from an interior of the shock absorber cartridge to the external wall of the housing, the cylinder having a side wall and said conduit being provided in said sidewall and in the housing, and means for sealing the conduit in regions where the conduit extends from the sidewall into the housing and from the cartridge into the sidewall.

3. A suspension element according to claim 1, comprising a housing fixed to the cylinder and a wheel-carrying arm extending through said housing, the cylinder having sidewall, the caloduct extending from an interior of the shock absorber cartridge to said chassis and provided in the sidewall of the cylinder, then in said housing and terminating in the chassis and forming therein a condenser for said gas, means being provided for sealing the conduit in regions where the conduit extends from the housing to the sidewall of the cylinder and from the housing to the chassis.

4. A suspension element according to claim 1, further comprising a chamber containing a gas which is incondensable within an operating temperature range of the suspension element, said chamber being disposed at said another end of the conduit and in communication with the interior thereof and means for adjusting the temperature of said chamber to shift an interface between the condensable and incondensable gases, and consequently control the temperature of the suspension element liquid and thus the ground clearance of a vehicle.

5. A suspension element as claimed in claim 4, wherein said means for adjusting the temperature of the chamber comprises an electric resistance.

6. A suspension element according to claim 4, wherein a volume of said chamber exceeds a volume of the caloduct.

7. A suspension element according to claim 1, wherein a tube containing a condensable gas is disposed in the caloduct.

8. A suspension element according to claim 1, wherein said one end of the caloduct comprises an annular chamber in the shock absorber cartridge which communicates with a first section of the caloduct formed radially in the cartridge and opening into a sidewall of the cylinder.

9. A suspension element according to claim 1, wherein the caloduct contains water as condensable fluid.

* * * * *